Patented Oct. 1, 1929.

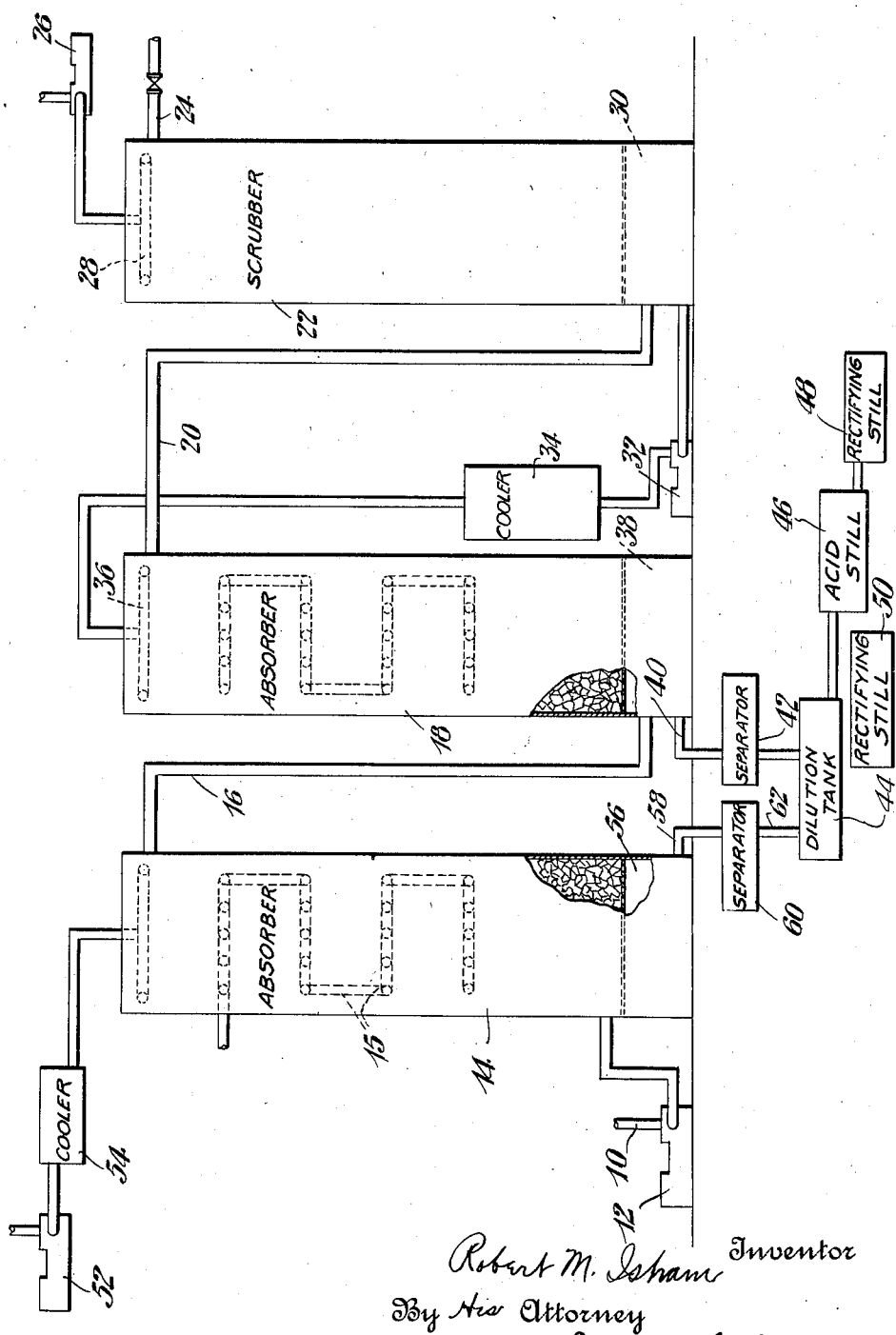

1,729,782

UNITED STATES PATENT OFFICE

ROBERT M. ISHAM, OF OKMULGEE, OKLAHOMA, ASSIGNOR, BY MESNE ASSIGNMENTS, TO SETH B. HUNT, TRUSTEE, OF MOUNT KISCO, NEW YORK

SEPARATION OF OLEFINES FROM PETROLEUM PRODUCTS

Application filed January 3, 1922. Serial No. 526,537.

This invention relates to the separation of olefines from petroleum products. More particularly the invention relates to the extraction of olefines from oil gases in such a form that alkyl alcohols and esters may be readily made therefrom.

Practically all of the lighter petroleum distillates such as gasoline and naphtha contain a substantial quantity of unsaturated hydrocarbons. The development of the cracking process for producing gasoline from heavier petroleum distillates has provided products which contain a comparatively high percentage of unsaturated hydrocarbons. Sulphuric acid has been commonly used for absorbing the unsaturated constituents from these petroleum distillates, and the effectiveness of the absorption has been found to depend upon the strength of the acid, the absorption temperature, and the character of the product being treated. By this sulphuric acid absorption it has been found that, if special caution is not taken to prevent it, the olefines of all of the petroleum products will be polymerized or resinified by the sulphuric acid.

The primary object of the present invention is to provide a process of separating olefine material from petroleum products, by which a high percentage of unsaturated products may be recovered and by which the polymerization and resinification of the olefines may be substantially overcome.

Another object of the invention is to provide a process of separating olefines from petroleum products in such a manner that the olefines may be readily converted into alkyl alcohols, acids and esters at a minimum cost.

With these and other objects in view, the invention consists in the improved process of separating olefines from petroleum products hereinafter described, and particularly defined in the claims.

In the copending application of Born and Isham, Serial No. 294,013, filed May 1, 1919, a process is described by which the olefines from oil gas may be selectively absorbed and separated. In this process the higher olefines such as hexylene, amylene and butylene are absorbed at a temperature below 0° C. by an absorbing agent comprising concentrated sulphuric acid and hydrogen sulphates of the lighter olefines such as propylene and ethylene. The propylene is absorbed from the gases at a temperature of about 20° C. in a menstruum comprising concentrated sulphuric acid and ethyl sulphuric acid. The ethylene is absorbed in the concentrated sulphuric acid at a temperature of about 80° to 90° C. The Born and Isham process is very effective in absorbing the higher olefines, while preventing the formation of polymerization products, and it was found that the presence of alkyl hydrogen sulphates in the absorbing menstruum permitted the process to be effectively carried out with a minimum loss of polymerization products. The presence of concentrated sulphuric acid in the absorbing menstruum requires that the temperature be held very low, in order to prevent the formation of polymerization products, although the alkyl hydrogen sulphates may be present. To cool the large body of gases being scrubbed as well as the absorbing menstruum involves considerable expense and complicated apparatus.

The present invention is based upon the discovery that the higher olefines such as amylene, hexylene, heptylene and butylene are absorbed in the sulphuric acid derivatives of the hydrocarbons. It has been found that these higher olefines will be absorbed, for example, in butyl sulphuric acid, propyl sulphuric acid, iso propyl sulphuric acid, and aromatic sulphonic acid such as benzene sulphonic acid and toluene sulphonic acid.

With this in view, the process of the present invention consists in first treating the petroleum products with sulphuric acid derivatives of unsaturated hydrocarbons to remove the higher olefines. The residual hydrocarbon products are then treated with a solution of concentrated sulphuric acid and ethyl sulphuric acid to recover any remaining olefines therein higher in the series than ethylene and the ethylene is then recovered from the residual hydrocarbon products with concentrated sulphuric acid. By this process the olefines of the petroleum products are selectively absorbed. The absorption of the higher olefines is preferably accomplished at temperatures below 20° C. in order to prevent the formation of polymerization products. The removal of propylene and any higher olefines in the residual petroleum products is preferably accomplished at temperatures below 30° C. The ethylene is removed from the petroleum products at a temperature about 80° to 90° C. The present process is particularly adapted for treating oil gases and when gases are being treated all of the absorbing operations are carried out under pressure.

In the drawing is diagrammatically illustrated an apparatus in which the process embodying the preferred form of the invention may be carried out.

The process above referred to may be carried into effect in the apparatus illustrated in the drawing, as follows:

Oil gas, which preferably comes from any of the stills of the ordinary refineries, is conducted through a main 10 to compressor 12, and then passed into an absorber 14. If the gas is furnished from a pressure still, the compressor 12 may be omitted because it is generally at a pressure of from 50 to 100 pounds per square inch which is suitable for the absorption. The absorber 14 preferably consists of a crock or coke tower in which a liquid menstruum consisting of an alkyl sulphuric acid is introduced at the top of the tower and passes downwardly therethrough while the gases pass upwardly through the tower countercurrent to the direction of the flow of the liquid menstruum. The gas may be cooled before being introduced into the absorber 14 and also the alkyl sulphuric acid is preferably cooled in order to maintain a temperature of approximately 15° C. This temperature is most effectively obtained by the use of the cooling coils 15 placed within the absorber 14. If the absorbing menstruum consists of ethyl sulphuric acid, the absorber 14 will remove the major portion of the olefines higher in the olefine series than ethylene. In commercial operation an absorbing menstruum containing a large proportion of propyl sulphuric acids will be used, and under such conditions the major portion of all olefines higher in the olefine series than propylene will be removed in the absorber 14.

The unabsorbed gas passes from the absorber 14 through a conduit 16 into an absorber 18, which is preferably a crock or coke tower. In the absorber 18 the gases are treated with a solution comprising concentrated sulphuric acid and ethyl sulphuric acid. This acid absorbing menstruum is preferably derived from a scrubbing tower in which ethylene is absorbed from the gases with concentrated sulphuric acid. The temperature of approximately 20° C. is maintained in the scrubber 18 and in this operation substantially all of the residual olefines higher in the olefine series than ethylene are absorbed.

The unabsorbed gases leaving the scrubber 18 pass through a conduit 20 into an ethylene absorbing tower 22. The absorbing tower 22 is preferably a crock or coke tower similar to the towers 14 and 18. In this tower the gas is scrubbed in a countercurrent flow with concentrated sulphuric acid, which is maintained at a temperature of approximately 80° C. After the olefines higher in the olefine series than ethylene have been removed in the scrubbers 14 and 18 the ethylene will be substantially completely absorbed in the scrubber 22. The residual gas leaving the scrubber 22 passes out through a conduit 24 and may be used after its pressure has been reduced, for fuel purposes or any other suitable purpose.

The concentrated sulphuric acid used in the scrubber 22 is supplied under pressure by means of a pump 26, and is introduced into the top of the scrubber 22 by a distributor 28. The acid flows downwardly through the filling of the scrubber and accumulates in a chamber 30 at the bottom of the scrubber 22. This acid contains a greater or less amount of ethyl sulphuric acid, in accordance with the amount of ethylene in the gases being scrubbed. The ethyl sulphuric acid has been found to be very effective for use in absorbing the olefines from oil gas which are higher in the olefine series than ethylene. Accordingly, the mixed concentrated sulphuric acid and ethyl sulphuric acid is drawn from the chamber 30 by means of a pump 32 and forced through a cooler 34 to a distributor 36 in the top of the absorber 18. This mixture of acid passes downwardly through the absorber 18 and accumulates in a chamber 38 at the bottom of the scrubber. The acid in the chamber 38 contains concentrated sulphuric acid, ethyl and propyl sulphuric acids, and some olefine sulphuric acids which are higher in the olefine series than propylene. This acid is drawn off from the chamber 38 through a pipe 40 to a separator 42 where any unabsorbed hydrocarbons, both saturated and unsaturated, are removed therefrom. The acid liquor is then placed in a dilution tank 44 where it is hydrated with water to separate therefrom any polymerization products and to partially hydrolyze the acid solution. The acid solution is then placed in an acid still 46 where it is completely hydrolyzed and the alcohols are fractionally distilled therefrom. The alcohol fraction within the boiling point range of ethyl alcohol is passed to a rectifying still 48 in which ethyl alcohol may be recovered. The alcohol fractions of the higher boiling point than ethyl alcohol are passed to another rectifying still 50 in which the propyl, butyl, and the higher alcohols may be separately recovered.

The sulphuric acid derivative of unsaturated hydrocarbons which is preferably used for absorbing the higher olefines from oil gas consists of alkyl hydrogen sulphates such as ethyl, propyl and iso propyl sulphuric acids.

These alkyl hydrogen sulphates may be used alone as an absorbing medium, or a mixture of two or more of these acids may be used for absorption. These alkyl acids are preferably recovered from the process and are made by taking the alcohol obtained from the rectifying still and esterifying them with an amount of concentrated sulphuric acid which is slightly greater than the amount theoretically required to form alkyl sulphuric acid. This alkyl sulphuric acid is introduced into the absorber 14 under pressure by means of a pump 52 and is preferably passed through a cooler 54 to assist in obtaining the proper absorption temperature in the absorber 14. The reaction between the alkyl sulphuric acids and the olefines of the oil gas is comparatively rapid, so that an efficient absorption can generally be obtained in one tower. If the percentage of olefines in the oil gas is high it may be desirable in some cases to carry out the absorption in a series of absorbers. In any case, however, it is desirable to effect the absorption as rapidly as possible, because the alkyl sulphuric acids are unstable and a high loss in polymerization of the olefine is encountered unless the absorption is effected quickly and the resulting acid is hydrolyzed in a short time thereafter.

The alkyl sulphuric acids which pass through the tower 14 accumulate in a chamber 56 at the bottom of the absorber and are drawn off through a pipe 58 into a separator 60, where the unabsorbed hydrocarbons are separated therefrom. The acid liquor from the separator 60 passes through a pipe 62 into the dilution tank 44 where water is added to partially hydrolyze the acid liquor and to separate any polymerized or resinified olefines therefrom. The acid liquor recovered in the separator 60 may be mixed in the dilution tank 44 with acid liquor accumulated in the separator 42, and the combined acid liquors may be hydrolyzed and sent to the still 46 for distillation. In many cases, however, it is desirable to treat the acid liquor derived from the absorber 14 separately from the acid liquor derived from the absorbers 18 and 22. In hydrolyzing the acid liquor to form the alkyl alcohols, water is used in the proportion of about three volumes of water to one volume of acid.

The use of the sulphuric acid derivatives of unsaturated hydrocarbons for absorbing the higher olefines is particularly advantageous in that these acid derivatives readily and effectively absorb the olefines without polymerizing them. Furthermore, the various alkyl acids which are preferably used for absorption permit a selective absorption to be carried out whereby only the olefines higher in the series than the olefine acid being used will be absorbed. Also, the reaction which takes place between the olefines and the alkyl acids is not violent, and does not generate or evolve heat to the extent of unduly raising the temperature so that lower temperatures are attained than when using concentrated sulphuric acid for the absorption of olefines. This is very important due to the fact that the equipment for cooling the corrosive acid liquors in the absorbing towers is expensive and troublesome to operate.

Ethyl sulphuric acid is a particularly effective absorbing agent for removing the higher olefines from oil gases, but a mixture of alkyl sulphuric acids which contains ethyl, propyl, and iso propyl acids may be used. When this mixture of acids is used it is not necessary to rectify the alcohols to separate the various alcohols before making the acid liquor, but a fractional cut may be obtained from the acid still which contains a mixture of the various alcohols. This mixture of alcohols may then be sulphated with concentrated sulphuric acid. The formation of the alkyl sulphuric acid from the alkyl alcohols is never quantitative but preferably a slight excess of sulphuric acid is used, in order to get a maximum sulphation of the alkyl alcohols. Sulphuric acid of from 80% to 100% strength may be used for absorption and for making the alkyl sulphuric acids, but it is preferred to use the 1.84 specific gravity acid because it gives a more rapid and effective absorption.

It will be noted from this process that the alkyl sulphuric acids which are used for absorption are recovered in the process and may be used over and over again. The ethyl and propyl sulphuric acids which are formed in the absorber 18 may be used in the absorber 14. However, in order to avoid the violent reaction which takes place between the higher olefines and concentrated sulphuric acid, it is desirable that the alkyl sulphuric acids which are used in the absorber 14 shall not contain a substantial amount of free concentrated sulphuric acid. To obtain the alkyl sulphuric acid absorbing agent, therefore, the olefines are recovered in the form of alcohols and then sulphated in order to avoid the presence of excess sulphuric acid, which is present in the acid solution collected in the chamber 38 at the bottom of the scrubbing tower 18. Thus, in effect, the process regenerates the alkyl sulphuric acids used for absorption. Also, the process regenerates the sulphuric acid which is used in absorption, because the acid used is recovered in the still 46, and may be concentrated to be again used.

When absorbing the olefines of the oil gases it has been found to be important that the absorption should be carried out under pressure. As the result of a large number of experiments it has been found that substantially 100 pounds per square inch is the most desirable pressure for carrying out the absorption. However, the pressures from 50 to 70 pounds per square inch have been found to be effective. The use of pressure gives a greatly increased capacity to the apparatus and appears to cut down the time of reaction and assists in avoiding the formation of polymerization products. Furthermore, the use of pressure with low temperature condenses the higher olefines so that they may be effectively brought into intimate contact with the absorbing agent, in order to assist in the efficient recovery of the olefines. The use of pressure also assists in maintaining the desired temperatures for absorption and allows the various volatile olefines to be effectively collected.

The use of alkyl sulphuric acids in the above process would appear to involve a reaction by which an alkyl acid of a lower olefine reacts with a higher olefine. The use of alkyl sulphuric acids for absorbing does not involve the highly exothermic reaction which takes place when sulphuric acid is used as an absorbing agent.

As pointed out above in connection with the copending application of Born and Isham Serial #294,013, the absorbing menstruums therein specified while in some cases containing alkyl sulphuric acid also contain free or concentrated sulphuric acid. Therefore when in the appended claims the phrase "alkyl sulphuric acid" or other equivalent expression is used to designate an absorption menstruum or agent, it is to be understood, unless otherwise specified in the claims, that the alkyl sulphuric acid is substantially free of other active constituents such as free sulphuric acid.

The preferred form of the invention having been thus described, what is claimed as new is:

1. A process of extracting olefines from oil gas comprising passing the gas through alkyl sulphuric acid at a low temperature, then passing the gas through a mixture of alkyl sulphuric acid and concentrated sulphuric acid at a low temperature and completing the absorption of the olefines from the gas in approximately 93.2% sulphuric acid at a higher temperature.

2. A process of separating olefines from mixed petroleum products comprising treating under sulphating conditions the products with an acid menstruum comprising a sulphuric acid derivative of an unsaturated hydrocarbon essentially free of active constituents other than alkyl sulphuric acids.

3. The process of separating olefines from mixed petroleum products comprising treating the products under sulphating conditions with an acid menstruum comprising a sulfuric acid derivative of an unsaturated hydrocarbon essentially free of active constituents other than alkyl sulfuric acids and then treating the products under sulphating conditions with sulfuric acid.

4. A process of separating olefines from mixed petroleum products comprising treating the products under sulphating conditions with an acid menstruum comprising a sulfuric acid derivative of an unsaturated hydrocarbon essentially free of active constituents other than alkyl sulfuric acids and then treating the products under sulphating conditions with approximately 93.2% sulfuric acid.

5. A process of separating olefines from mixed petroleum products comprising treating the products under sulphating conditions with an acid menstruum comprising a sulfuric acid derivative of an unsaturated hydrocarbon essentially free of active constituents other than alkyl sulfuric acids and then treating the products under sulphating conditions with a mixture of sulfuric acid and alkyl sulfuric acid.

6. A process for extracting olefines from oil gas comprising passing the gas under pressure and under sulfating conditions through a menstruum comprising a sulfuric acid derivative of an unsaturated hydrocarbon essentially free of active constituents other than alkyl sulfuric acids.

7. A process of separating olefines from mixed petroleum products comprising treating the products with an acid menstruum comprising a sulphuric acid derivative of an unsaturated hydrocarbon essentially free of active constituents other than alkyl sulphuric acids at a temperature below 20° C.

8. A process of extracting olefines from oil gas comprising passing the gas under pressure through a menstruum comprising a mixture of alkyl sulfuric acids essentially free of other active constituents.

9. A process for separating olefines from mixed petroleum products comprising treating the products under sulfating conditions with an absorbing menstruum comprising ethyl sulfuric acid which is essentially free of active constituents other than alkyl sulfuric acids.

10. A process of separating olefines from mixed petroleum products comprising treating the products under sulphating conditions with a menstruum comprising a mixture of ethyl and propyl sulfuric acids essentially free of other active constituents.

11. A process of separating olefines from mixed petroleum products comprising treating the products under sulphating conditions with an absorbing menstruum comprising a mixture of olefine sulfuric acids lower in the olefine series than the olefines to be separated, said menstruum being essentially free of other active constituents.

12. A process of extracting olefines from oil gas comprising scrubbing the oil gas at a low temperature with alkyl sulphuric acid to absorb olefines higher in the olefine series than ethylene, and then removing ethylene from the gas by scrubbing the gas at a high temperature with approximately 93.2% sulphuric acid.

13. A process of extracting olefines from oil gas comprising scrubbing the gas at a low temperature with alkyl sulphuric acid to absorb olefines higher in the olefine series than ethylene, scrubbing the residual gas under sulphating conditions with approximately 93.2% sulphuric acid to form ethyl sulphuric acid, separating the ethyl sulphuric acid and using it for the low temperature scrubbing.

14. A process of extracting olefines from oil gas comprising scrubbing the gas under pressure at a temperature below 20° C. with a liquid menstruum comprising essentially alkyl sulphuric acid, scrubbing the residual gas at a temperature below 30° C. in a menstruum comprising sulphuric acid, and alkyl sulphuric acid, and then scrubbing the residual gas with approximately 93.2% sulphuric acid at a temperature of about 80° C.

In testimony whereof I affix my signature.

ROBERT M. ISHAM.